United States Patent [19]
Schmidt

[11] Patent Number: 5,240,079
[45] Date of Patent: Aug. 31, 1993

[54] GUIDANCE CONTROL SYSTEM FOR FARM TRACTOR/IMPLEMENT COMBINATION HAVING IMPROVED TURNAROUND CAPABILITY

[75] Inventor: Eugene H. Schmidt, Madrid, Nebr.

[73] Assignee: A.I.L., Inc., North Platte, Nebr.

[21] Appl. No.: 920,757

[22] Filed: Jul. 28, 1992

Related U.S. Application Data

[63] Continuation-in-part of Ser. No. 685,391, Apr. 4, 1991, Pat. No. 5,170,849, which is a continuation-in-part of Ser. No. 533,018, Jun. 4, 1990, Pat. No. 5,025,866.

[51] Int. Cl.⁵ .................... A01B 63/10; A01B 63/32
[52] U.S. Cl. ........................ 172/6; 172/2; 280/412
[58] Field of Search ............ 172/2, 5, 6; 280/455.1, 280/474, 412, 413

[56] References Cited

U.S. PATENT DOCUMENTS

| | | |
|---|---|---|
| 1,111,243 | 9/1914 | Whitworth . |
| 2,730,030 | 1/1956 | Chambers . |
| 2,743,656 | 5/1956 | Fraga . |
| 2,993,548 | 7/1961 | Kiel . |
| 3,183,976 | 5/1965 | Rollins . |
| 3,326,319 | 6/1967 | Schmidt . |
| 3,512,587 | 5/1970 | Shader . |
| 3,537,531 | 11/1970 | Fischer et al. . |
| 3,795,285 | 3/1974 | Scholl et al. . |
| 3,797,602 | 3/1974 | Sumida . |
| 3,998,275 | 12/1976 | Eisenhardt . |
| 4,031,962 | 6/1977 | Ellinger . |
| 4,074,766 | 2/1978 | Orthman . |
| 4,077,488 | 3/1978 | Bennett, Jr. et al. . |
| 4,180,133 | 12/1979 | Collogan et al. . |
| 4,184,551 | 1/1980 | Orthman . |
| 4,228,860 | 10/1980 | Orthman . |
| 4,266,616 | 5/1981 | Mueller, Jr. . |
| 4,281,720 | 8/1981 | Tusing . |
| 4,298,084 | 11/1981 | Newell . |
| 4,336,846 | 6/1982 | Boetto . |
| 4,366,966 | 1/1983 | Ratsko et al. ............... 280/455.1 |
| 4,367,802 | 1/1983 | Stiff et al. . |

(List continued on next page.)

FOREIGN PATENT DOCUMENTS

| | | |
|---|---|---|
| 55168 | 4/1967 | German Democratic Rep. . |
| 482139 | 11/1975 | U.S.S.R. . |
| 731915 | 5/1980 | U.S.S.R. ......................... 172/6 |
| 1176864 | 9/1985 | U.S.S.R. . |
| 1349707 | 11/1987 | U.S.S.R. . |
| 1440373 | 11/1988 | U.S.S.R. ......................... 172/2 |

OTHER PUBLICATIONS

Farm Show, "'Owner's Report' On Automatic Guidance Systems", vol. 13, No. 3, 1989, pp. 24-25.
Sunco, "Acura Trak Guidance Control", sales brochure, Feb. 1989.
Buffalo Farm Equipment, "The Guidance System", sales brochure. Fleischer Manufacturing, Inc.

(List continued on next page.)

Primary Examiner—Randolph A. Reese
Assistant Examiner—Warnick, Spencer
Attorney, Agent, or Firm—Welsh & Katz, Ltd.

[57] ABSTRACT

A guidance system is disclosed for the combination of a farm tractor and trailing implement, wherein the guidance system is of the type where the implement is attached to a 3-point hitch mechanism that can be angularly oriented in a horizontal plane by extending one side relative to the other to change the angle of the hitch relative to the drive axle of the tractor. Another embodiment operates with an implement that is attached with a single pull hitch. The system operates in a turn around mode for the pull hitch embodiment where the implement swings outwardly during turning to minimize the turning radius for the combination of the tractor and the implement. Another embodiment of the system for a 3-point hitch attachment causes the implement to be centered behind the tractor for a farming operation where no crops or furrows are present.

9 Claims, 8 Drawing Sheets

OTHER PUBLICATIONS

Buffalo Farm Equipment, "The Ultimate Guidance System For Your Cultivator", sales brochure. Fleischer Manufacturing, Inc.

Buffalo Farm Equipment, "The Ultimate Guidance System For Your Cultivator Or Planter", sales brochure. Fleischer Manufacturing, Inc.

Sukup Manufacturing Company, "Auto Guide Guidance System", sales brochure.

Lincoln Creek Manufacturing Co., Inc. "Quick Hitch" flyer, Sep. 1988.

HR Manufacturing Co., "Navigator Guidance System" brochure, Jun. 1989.

Orthman Manufacturing, Inc. "MP III Tracker Automatic Guidance System Featuring The First Microprocessor Guidance System" sales brochure.

Orthmann Product Catalog and Price List, 1988.

U.S. PATENT DOCUMENTS

| Number | Date | Name | Class |
|---|---|---|---|
| 4,449,590 | 5/1984 | Williamson . | |
| 4,463,811 | 8/1984 | Winter . | |
| 4,607,716 | 8/1986 | Beck . | |
| 4,616,712 | 10/1986 | Jorgensen . | |
| 4,640,365 | 2/1987 | Schmidt . | |
| 4,763,916 | 8/1988 | Ratskó et al. | 280/455.7 |
| 4,835,691 | 5/1989 | Rotem et al. . | |
| 4,883,128 | 11/1989 | O'Neall et al. . | |
| 4,923,015 | 5/1990 | Barsby et al. . | |
| 4,923,017 | 5/1990 | Meek et al. . | |
| 4,930,581 | 6/1990 | Fleischer et al. . | |
| 4,969,527 | 11/1990 | Boe et al. | 172/2 |
| 5,025,866 | 6/1991 | Schmidt et al. . | |
| 5,031,704 | 7/1991 | Fleischer et al . . | |
| 5,040,613 | 8/1991 | Dodd et al. . | |
| 5,152,544 | 10/1992 | Dierkev, Jr. et al. | 280/455.1 |
| 5,170,849 | 12/1992 | Nikkel et al. | 172/6 |
| 5,181,572 | 1/1993 | Anderson et al. | 172/6 |

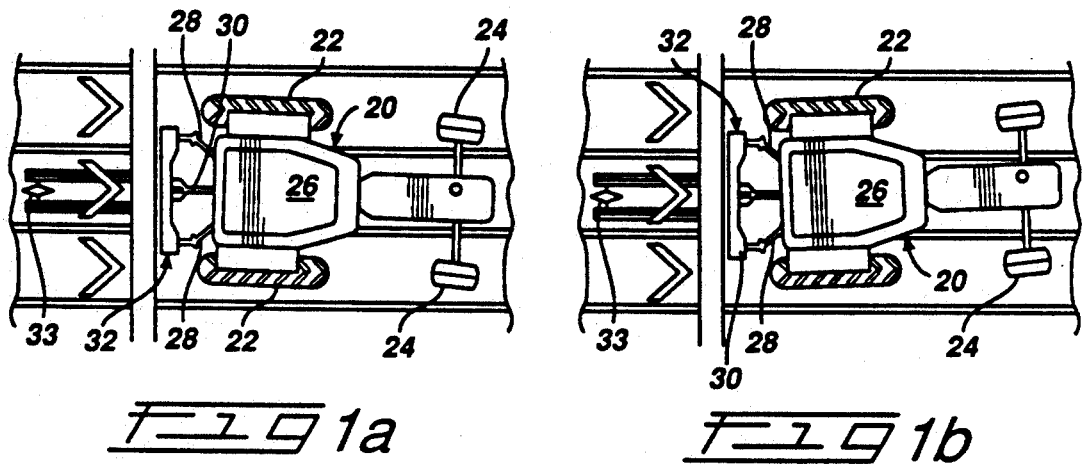
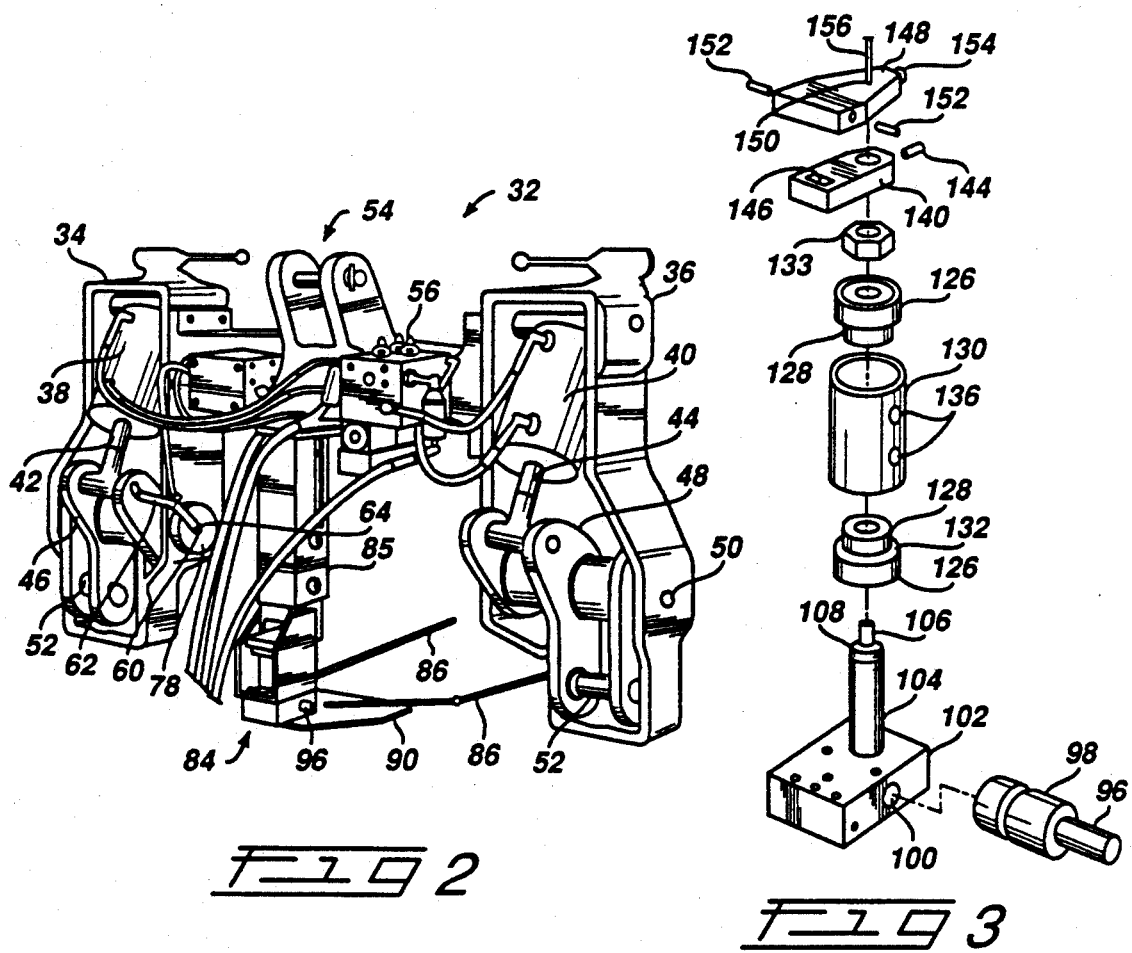

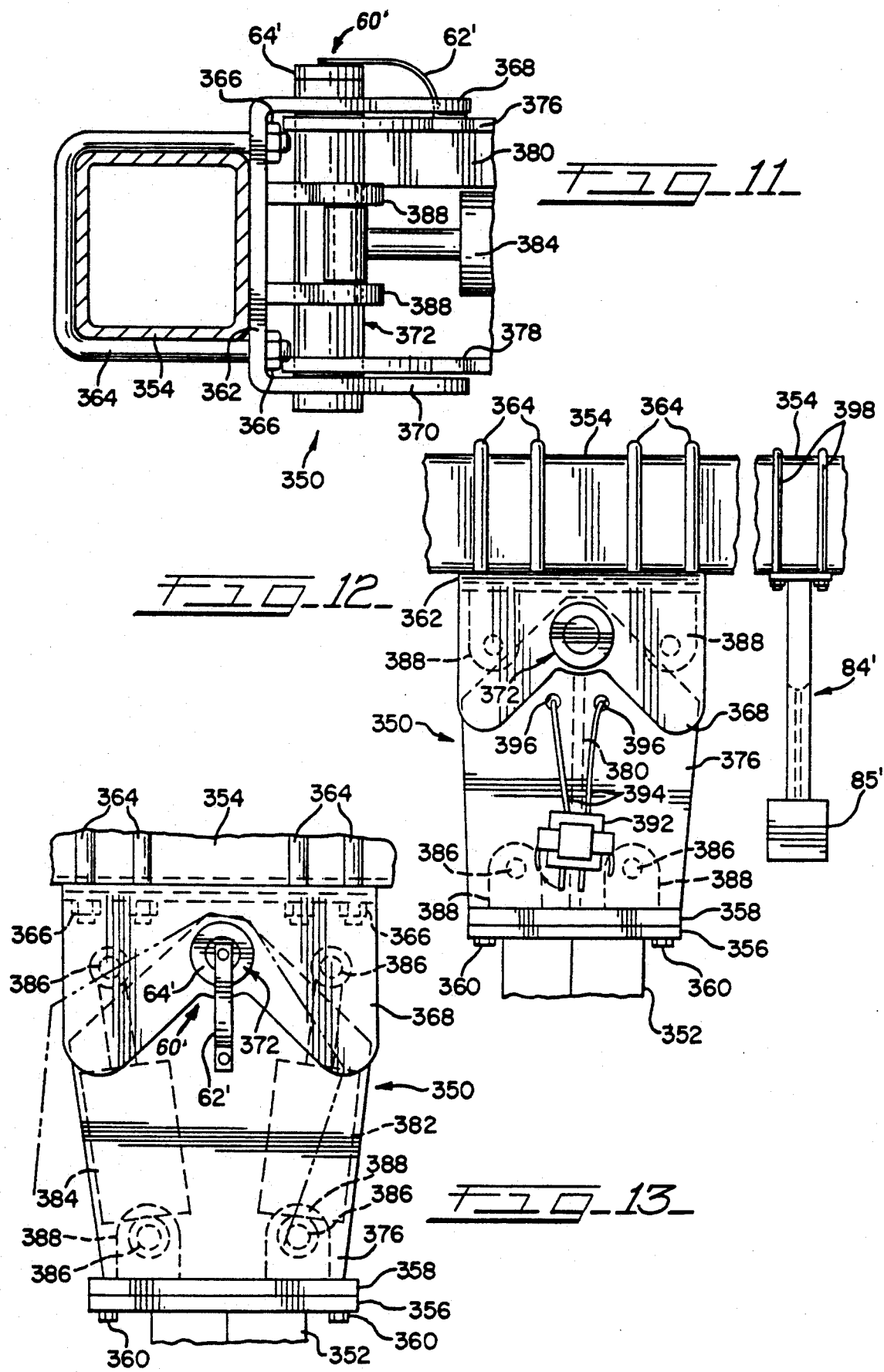

GUIDANCE CONTROL SYSTEM FOR FARM TRACTOR/IMPLEMENT COMBINATION HAVING IMPROVED TURNAROUND CAPABILITY

This is a continuation-in-part of patent application Ser. No. 685,391, filed Apr. 4, 1991, now U.S. Pat. No. 5,170,849, which in turn is a continuation-in-part of patent application Ser. No. 533,018 filed Jun. 4, 1990, now U.S. Pat. No. 5,025,866 issued Jun. 25, 1991.

The present invention generally relates to guidance control systems for implements that trail a vehicle and more particularly to a guidance system for a farm implement in combination with a farm tractor. More particularly, the present invention relates to an improvement which facilitates easier turnaround of the tractor and a pull hitch type implement. An alternative embodiment relates to a tractor having a quick hitch or 3-point hitch configuration with a trailing implement, such as is disclosed in Schmidt U.S. Pat. No. 4,640,365, wherein the implement is maintained in a centered position during operation without the wand sensor operating, such as would occur during an initial planting operation, for example.

There has been a continuing desire of operators of farm tractors as well as other vehicles for a guidance control system that would aid the operator in traveling along a desired path through a field more accurately. This continuing desire has resulted in the development of many prior art systems, some of which are more effective and reliable than others. While some guidance systems are more concerned with controlling the tractor itself, a more effective approach is to control the position of the implement relative to the tractor that it is pulling it, with the focus being on proper positioning of the implement rather than the tractor itself If an operator is cultivating a crop that has already reached a stand, or is applying herbicide or the like, the difficulty does not reside in the operator being able to keep the tractor between the rows without the tractor wheels crushing the crop, but rather keeping the implement from getting too close to the crop which could, in the case of cultivation, result in damage to the roots of the crop by the cultivator blades. In the case of applying herbicide or the like, it is obviously desirable to have the herbicide applied as close to the crop as possible so that an effective kill of the weeds can be accomplished without damaging the plants.

Systems have been developed which have the implement being towed attached to the tractor by a mechanism which effectively lengthens one side relative to the other operating in combination with a stabilizing wheel which is a disc-like wheel that is located rearwardly of the hitch and attached to the implement and which provides a fulcrum about which adjustment of the draw bar makes the necessary corrections. While prior art systems have utilized this basic mechanical concept in their operation, the control of the implement relative to the tractor is done in different ways. The control mechanisms which control the operation of the mechanical portions of such systems may include sensing wands and the like, which generally control the operation of hydraulic cylinders and these control mechanisms also operate in different ways.

While the use of a wand mechanism associated with the implement which is dragged along the ground is a common means for sensing the relative position of the implement to the row, the use of only the wand sometimes does not result in totally acceptable or reliable performance. Moreover, the wand is generally pivotally mounted on the implement and its angular position is sensed for the purpose of providing a corrective signal for controlling the guidance system and various means have been used to sense this position, including infrared emitters and detectors, as well as potentiometers. Infrared sensors tend to become soiled because of the dusty conditions in the field and potentiometers tend to wear out in a relatively short time Additionally, an infrared radiation control scheme generally requires additional circuitry for providing a usable corrective signal which increases the manufacturing costs.

The capabilities of the guidance system not only facilitate the accurate positioning of the implement relative to the crop rows as the tractor travels through the field, but enables the implement to be controlled so that easier turnaround of the tractor and implement can be accomplished for an implement that is attached to the tractor using a pull hitch. For a 3-point hitch arrangement, the implement can be kept centered relative to the tractor during an initial field operation where no row crops or furrows exist.

Accordingly, it is a primary object of the present invention to provide an improved guidance system for the combination of a farm tractor and trailing implement, wherein the guidance system is of the type where the implement is attached to a 3-point hitch mechanism that can be angularly oriented in a horizontal plane by extending one side relative to the other to change the angle of the cross bar relative to the drive axle of the tractor.

Another object of the present invention is to provide such an improved guidance system which is useful for operation with an implement that is attached with a single pull hitch.

Yet another object of the present invention is to provide such an improved guidance system which has the additional capability of guiding an implement that is connected to a tractor by a pull hitch so that the tractor and implement can be turned around in a relatively small area at the end of the crop rows to reenter the adjacent rows of the field.

Still another object of the present invention is to provide such an improved guidance system which automatically switches the guidance system from the row following mode to the turnaround mode in response to the tractor operator activating the pull hitch type implement to raise the implement tools from working engagement in preparation for turning around the tractor and implement to reenter the next crop rows.

Yet another object of the present invention is to provide such an improved guidance system which controls the position of the pull hitch type implement during the turn around after the implement has passed the end of a crop row to cause the implement to enter the next adjacent rows at an entrance angle relative to the rows that will minimize damage to the crops by the implement upon reentering the next rows.

Another object of the present invention is to provide another closely related embodiment of the improved guidance system which controls the position of the implement of the type which is connected to the tractor by a quick hitch or 3-point hitch, wherein the system has a row following mode and a trail centering mode of operation, and wherein in the latter mode, the implement will be maintained in a centered position relative to the tractor during a planting operation or the like, where no furrows or crops may be present. The centered position is maintained even though the sway blocks are removed, which means that the implement can be moved from side to side relative to the tractor.

Other objects and advantages will become apparent from the ensuing, detailed description, while referring to the attached drawings, in which:

FIGS. 1A and 1B are greatly simplified top views of a tractor traveling down a row and illustrating the operation of the hitch mechanism that is associated with the guidance system disclosed herein and also showing a trailing implement that is equipped with a stabilizing disc;

FIG. 2 is a perspective view of the rear of the mount hitch that is attached to a tractor and to which the implement is to be attached, and also illustrating the wand that extends rearwardly of the tractor when the mount hitch is installed;

FIG. 3 is an exploded perspective of the structure of the wand position sensor portion of the apparatus of the guidance system;

FIG. 11 is a side elevation of another embodiment of the guidance system that is useful for a pull hitch implement, and the side elevation illustrates a portion of the implement with a portion of the apparatus of the other embodiment;

FIG. 12 is a top plan view of the embodiment shown in FIG. 11, with portions removed, but illustrating some of the hydraulic, components and the wand sensor of the apparatus;

FIG. 13 is another top plan view of the embodiment shown in FIGS. 11 and 12, with portions removed, and particularly illustrating the hydraulic cylinders, and another angular position of the pull hitch relative to the implement tool bar also being shown in phantom;

Figure 18:
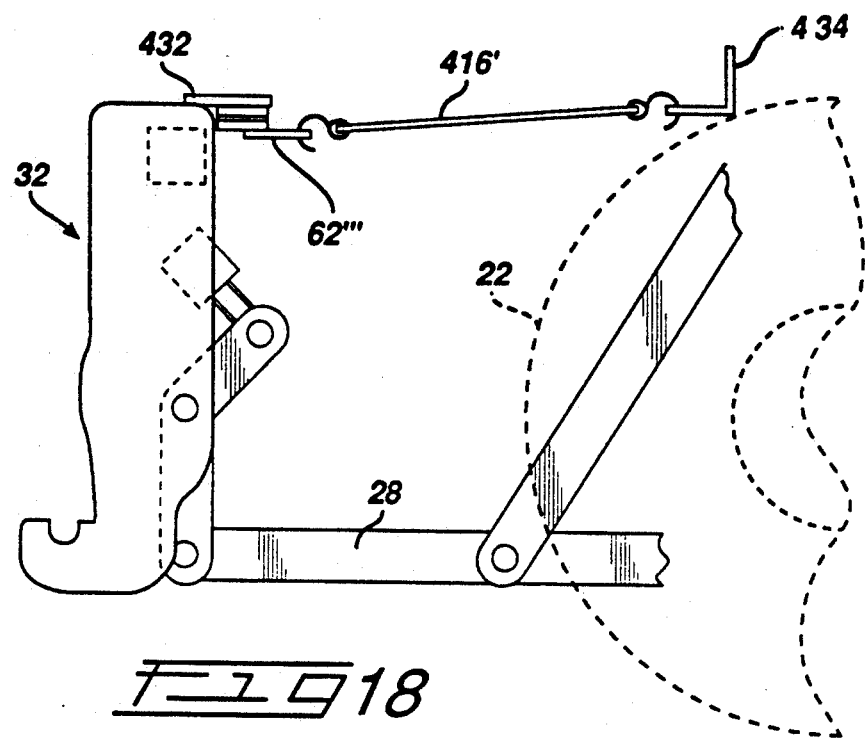
Figure 19:
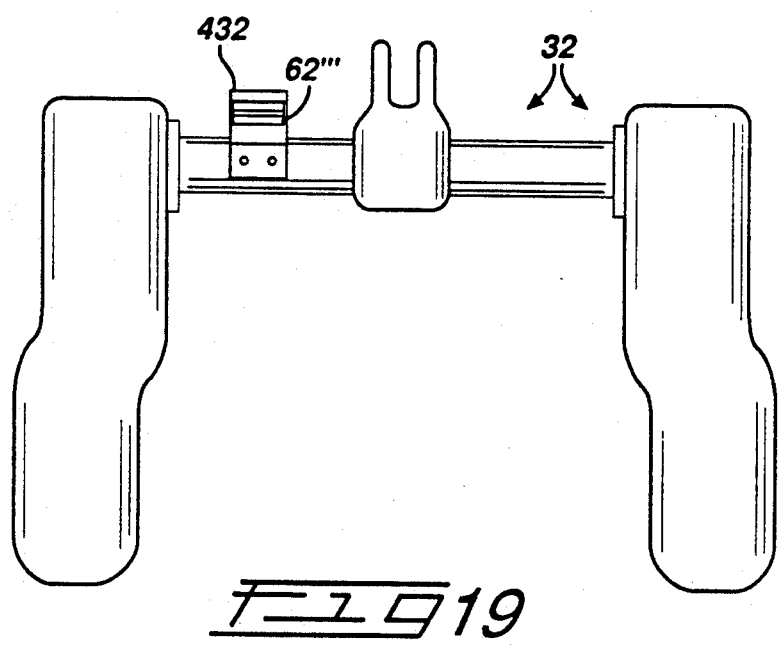

FIG. 18 is a simplified side elevation of a portion of a tractor and the mount hitch that is attached to the tractor and to which the implement is to be attached, and also illustrating an alternative embodiment of the trail sensor and the manner in which it is connected to the tractor; and, FIG. 19 is a simplified rear view of the mount hitch shown in FIG. 18 and illustrating the trail sensor attached thereto.

DETAILED DESCRIPTION

Broadly stated, a guidance control system for farm tractors in combination with a trailing implement is shown and described herein, although the guidance system is not limited to such a particular application. It is contemplated that the guidance control system could be used with vehicles other than farm tractors and could have general applicability to any such vehicle that would utilize a mounting hitch to which some type of implement could be attached and where angular positioning of the implement is desired.

However, the system is particularly useful in guiding implements that trail a tractor such as those used in row crop farming. The system includes a hitch that is mounted to a 3-point tractor hitch and the hitch of the guidance system is adapted to move in a manner whereby each side of the hitch may be extended or retracted, with the extension of one side resulting in retraction of the other, thereby changing the angle of the guidance system hitch relative to the angle of the tractor hitch. Stated in other words, the angle of the guidance system hitch may be varied relative to the direction of the axle of the rear tractor drive wheels. An alternate embodiment of the system is adapted for use with implements that have a trailing hitch, rather than a 3-point hitch, and the same principles apply.

The present invention represents an improvement to the guidance system disclosed and claimed in U.S. Pat. No. 5,170,849 (Ser. No. 685,391) in that it has the capability of operating in two different modes for each of the preferred embodiments and for an alternative embodiment. For both embodiments, one of the modes is the row following mode, where the implement is guided to maintain a preferred position relative to the crop rows during a field operation. For the preferred embodiment, the other mode is a turn around mode, which is intended for an implement of the type which has a pull hitch for attachment to the tractor. With respect to the turn around mode, the system automatically switches to this mode when the operator reaches the end of a row of crops and operates the hydraulic system to raise the implement to disengage the implement's operating tools from the ground. Actually, this is typically accomplished by hydraulic cylinders operating to lower the implement's wheels that had been raised from the ground so that the wheels engage the ground and then lift the implement upwardly. When this is done, the operator drives the tractor to turn it and the implement around to enter the next set of adjacent rows, whereupon the wheels are raised to lower the implement and continue the farming operation down those rows.

It is obvious that the turn around area is desirably as small as possible so that the crop area can be maximized. If the tractor and implement require a large area to turn around in, then the plants at the ends of the rows are apt to be damaged or destroyed. It is also similarly desirable that the implement follow the tractor into the rows directly behind the tractor, for if it is following at one side or the other, the implement can damage the plants until it becomes centered. The system of the present invention when used with the pull hitch type implement embodiment controls the hitch during the turn around mode so that the required turn around area is minimized, and the implement is centered behind the tractor before the implement enters the next adjacent rows.

Broadly stated, the manner in which this is accomplished is to control the angle of the implement tool bar relative to the pull hitch so that the implement will swing outwardly at least equal to or beyond the turning radius of the tractor initially, and then come back in to a centered position directly behind the tractor as the tractor enters the rows after having turned around.

With respect to the alternative embodiment which involves the system being used with a tractor-implement combination that is connected by a 3-point hitch (also known as a quick hitch) and in this embodiment, the system can be operated in a center trailing mode where the implement is maintained in a centered position as the tractor goes along a path. This is desirable when a crop is being planted in a field that does not have furrows or plants in which a wand mechanism can follow. It should be understood that during operation in the row following mode, the guidance system requires that the sway blocks of the 3-point hitch be removed so that the implement can be free to move from side to side during operation. Since the implement is therefore free to move laterally, when there is no wand sensor operation when planting a crop for example, the implement may not travel along the desired path even if the tractor does. The present invention maintains the implement centered directly behind the tractor during the center trailing mode of operation.

Referring to the drawings, and particularly FIGS. 1A and 1A, there is shown a tractor, indicated generally at 20, which has rear drive wheels 22 and front wheels 24 for steering the same. Immediately behind the cab 26 is a 3-point tractor hitch comprised of outer draft links 28 and a center link 30 for mounting implements. The hitch of the guidance system, indicated generally at 32, is connected to the hitch elements 28 and 30 of the tractor hitch and the implement is then attached to three points of the guidance system hitch 32.

As can be appreciated from FIG. 1A, if the tractor is angled to the right relative to the direction of the rows, the upper or left side of the hitch 32 is extended with the lower or right side retracted so that the angle of the guidance system hitch 32 is more perpendicular to the orientation of the rows. As shown in FIG. 1B, if the tractor is angled to the left relative to the rows, the lower side of the hitch is extended while the upper is retracted and this also maintains the guidance system hitch 32 in the generally perpendicular position. Regardless of whether the upper or lower sides of the hitch is extended or retracted, the center of the hitch has a relatively constant length during operation.

The diagrammatic representations of FIGS. 1A and 1B also show a stabilizing disc 33 that is mounted to the implement and located some distance from the system hitch 32. This stabilizing disc 33 penetrates into the soil and acts as a fulcrum about which the implement can be angled. Stated in other words, when the angle of the hitch 32 is changed, it slightly changes the angular orientation of the stabilizing disc 33 and causes the implement to be transversely moved during forward movement to bring the implement back to center along the desired path of movement. It should be understood that while it is preferred that a stabilizing disc 33 be used, a stabilizing wheel may used. It may be possible that some implements may not require a stabilizing disc at all, provided that the natural operational characteristics of the implement be such that the implement would tend to rotate in the same way as if a stabilizing disc were present.

Thus, with the corrections that are made by the guidance system, the tractor does not have to be precisely maintained along the desired path and the system will maintain the implement in the center of the rows. It should also be appreciated that when the angle of the guidance system hitch is changed relative to the tractor hitch, it is also important that the arms of the tractor hitch be adjusted so that they can move from side to side by a predetermined amount, preferably about 10 inches. This permits angulation of the system hitch to result in the centering movement of the system hitch as well as the rear portion of the tractor hitch relative to the lateral position of the tractor itself. Such adjustment generally involves the removal of sway blocks, which when they are present, restricts the transverse movement of the tractor hitch. However, the removal of such sway blocks should only be done for the tractor hitch in the lowered or working position. Upper sway blocks should be present to keep the tractor hitch and attached implement from banging from side to side during transport or the like.

With respect to the alternate embodiment for use with a trailing hitch, the implement hitch arm is attached to a single preferably center hitch of the tractor and rotates about the hitch pin. By changing the angular position of the trailing hitch arm relative to the transverse implement tool bar, the same transverse centering movement is obtained.

An advantage of such a guidance system is that more accurate operation can be achieved with less skill and effort. Among other advantages, relatively lesser skilled operators can do the work, and the quality of the job is not appreciably affected.

Referring to FIG. 2, which shows the guidance system hitch 32 from the rear end, i.e., the end which attaches to the tractor, the hitch 32 has a left side casting 34, a right side casting 36, which respectively contain left and right hydraulic cylinders 38 and 40. The cylinder 38 has an extendable piston 42 whereas the cylinder 40 has a similar piston 44, with each of the pistons being connected to crank arms 46 and 48, respectively, each of which pivots around a shaft such as the right shaft 50, the left not being shown. The crank arms 48 have a mounting pin 52 for attachment to the tractor hitch. A center clevis, indicated generally at 54, also mounts to the third point of the 3-point tractor hitch. The cylinders 38 and 40 are connected to a hydraulic system, generally contained within the box 56, which is preferably connected to the hydraulic system of the tractor. The hydraulic lines are preferably connected so that extension of one cylinder 38 will result in displacement of fluid from one end of the cylinder and will cause a similar displacement in the opposite cylinder 40 to result in comparable retraction of its piston 44. Movement of the pistons 42 or 44 will rotate the crank arms 46 or 48 around their shafts and by virtue of the connection with clevis pins 52, result in movement of one side or the other toward and away from the tractor to thereby change the angular orientation of the guidance system hitch 32 relative to the tractor.

Figure 7:
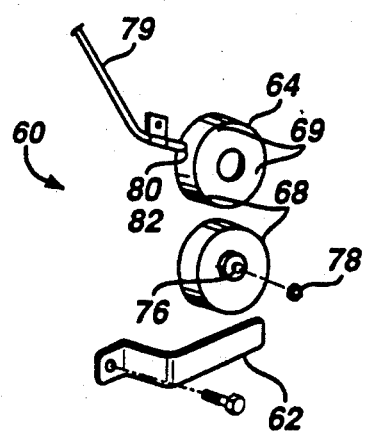
FIG. 7 is an exploded perspective of a portion of the mounting hitch sensor which is also shown in FIG. 2.
Figure 8:
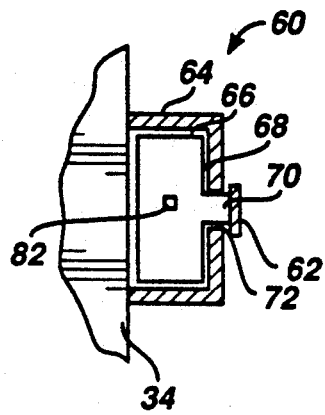
FIG. 8 is a side elevation of a portion of the mounting hitch sensor, shown partially in section.

To measure the position of the crank arms and thereby the angular orientation of the guidance system hitch 32, a hitch angle sensor mechanism, indicated generally at 60, is provided and it comprises a rotatable arm 62 that is connected to the crank arm and pivots around a sensor mechanism shown in FIGS. 7 and 8. The sensor mechanism includes a stationary outer housing 64 which has an internal recess 66 in which a rotatable rotor element 68 is located. This element has an outer diameter slightly less than the diameter of the recess and a thickness slightly less than the thickness of the recess so that it is free to rotate within the recess. The housing 64 is preferably secured to the side of the left casting 34 by suitable screws 69 located in the outer periphery of the same. The rotor element 68 has a small annular extension 70 which protrudes through a slightly larger diameter aperture 72 in the housing 64 and has a threaded aperture 76 to which a bolt 78 attaches the lever arm 62.

The housing 64 has an electrical conductor 79 extending therefrom and it is connected to a Hall effect sensor 80 that comprises a sensor element which measures changes in magnetic flux relative to the head and generates a signal that is proportional to the magnitude of such flux. The rotor 68 has a small relatively strong magnet 82 located in a suitable recess therein and preferably epoxy thereto and flush with the outer periphery. While not critical, the size of the magnet is approximately $\frac{1}{4} \times \frac{1}{4} \times 0.6$ inch, with opposite ends being magnetic north and south.

From the foregoing description, it should be appreciated that as the rotor 68 is turned by action of the crank arm and the lever arm 62 rotating, the Hall effect sensor 80 will detect changes in the rotation and generate an electrical output that is applied to the circuitry to be described via conductor or line 78.

Figure 4:
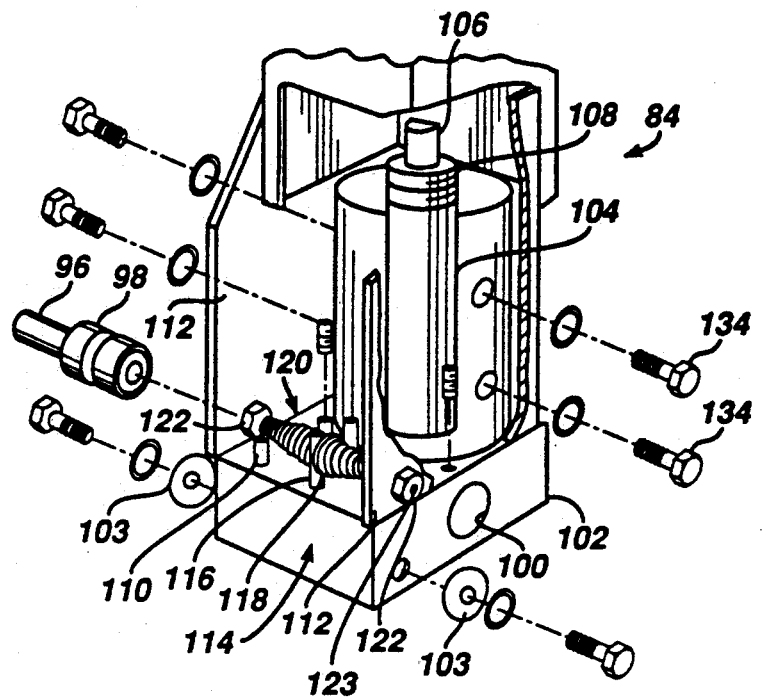
FIG. 4 is a partially exploded perspective of the wand sensor assembly and is an enlargement of a portion of the perspective shown in FIG. 2.
Figure 6:
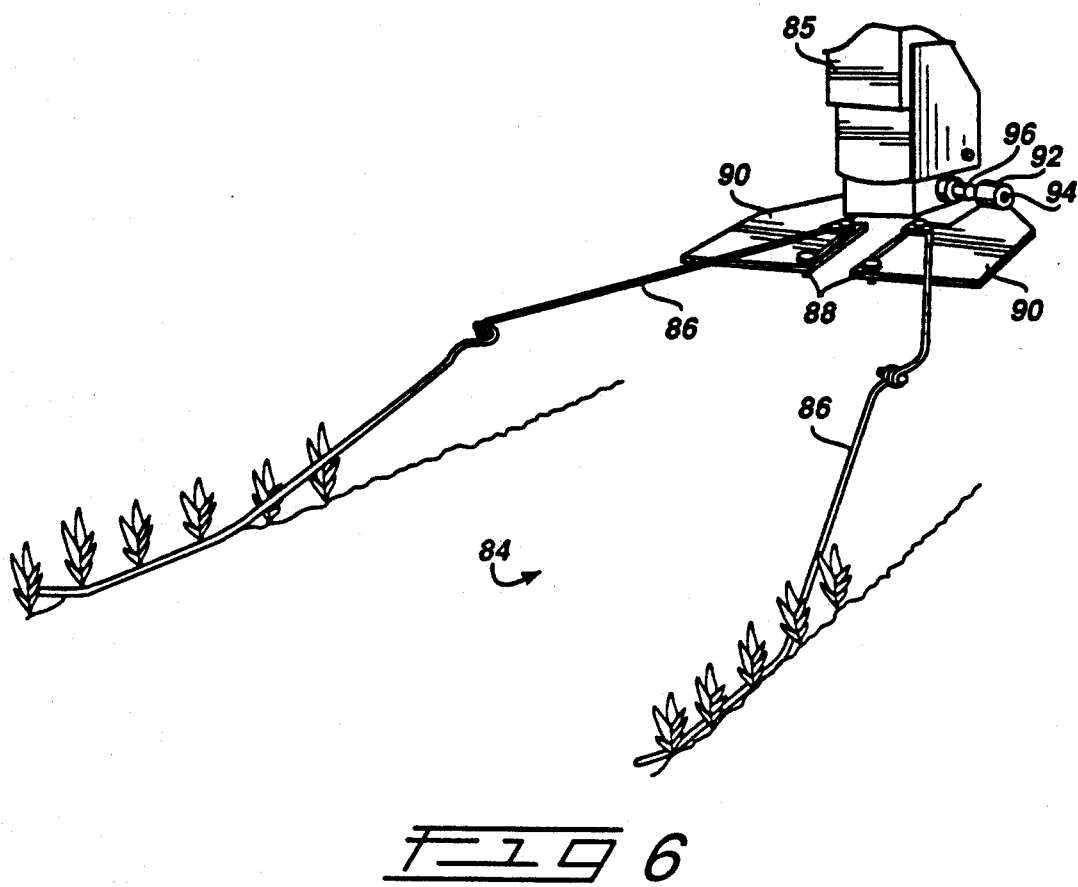
FIG. 6 is a perspective of the structure of the wands and associated support structure.

As previously generally mentioned, the guidance system of the present invention also includes a wand assembly, indicated generally at 84, and which is shown in FIGS. 2, 4 and 6. As shown in FIGS. 2 and 6, the wand assembly 84 is supported by a center housing 85, but it should also be appreciated that it is not essential that the center housing 85 be present. The wand assembly 84 may be mounted laterally of the center by one or two rows if desired. In this regard, such an off center mounting may be desirable for implements which require the use of the tractor power takeoff, which is located in the center. It is also useful for the alternate embodiment illustrated in FIGS. 11-13.

The wand assembly 84 has a generally wishbone shape and comprises two wand arms 86, which extend rearwardly of the guidance system hitch 32. These wands can be vertically adjusted and the spacing between them can also be adjusted to correspond with the width of rows of the crop or the like, which they are intended to detect. The distance between the two wands can be adjusted by varying the location of bolts 88 located in horizontally oriented plates 90 which preferably have a end portion 92 and a sleeve 94 which fits on a shaft element 96. The plates 90 therefore are free to pivot vertically around the shaft 96. The shaft elements 96 have an enlarged end bushing portion 98 which are force fit into suitable apertures 100 located in a pivotal block 102. This block also has off centered cam elements 104 suitably attached thereto which can be adjusted for the purpose of changing the angular orientation of the plates 90 when the implement is raised during traveling or turning around in the field. This results in the wand arms 86 being elevated as the implement is elevated.

The angular position of tee wand arms relative to the guidance system hitch 32 is detected by the structure to which the block 102 is mounted. This block 102 is adapted to rotate around a shaft 104 that is fixedly attached thereto and which has a reduced diameter end portion 106 and threads 108 adjacent thereto on the larger shaft portion. Referring to FIG. 4, the block 102 has end pins 110 frictionally set in apertures thereof which, during rotation, limit movement thereof by these pins 110 contacting one or the other of side plates 112. There is a spring biased centering mechanism, indicated generally at 114, which returns the wands to a center position if they are not in contact with crops, rows or the like. This centering mechanism includes a pair of pins 116 to which washers 118 bear. A pair of springs 120 are provided which bear against the washers 118 and against respective nuts 122. The centering mechanism includes a shaft 123 having an enlarged center portion which fits between the pins 116 when the mechanism is centered. The shaft 118 extends through the side plates 112 and a threaded end portion is secured by a nut 124 on the outside. The center portion is larger than the inside diameter of the washers so that rotation of the block 102 results in the pins bearing against the washer on the side to which the block 102 is being moved and compressing that spring. The center portion retains the other washer 118 and the spring associated with that side does not become compresses unless the block is pivoted in the opposite direction.

By adjusting the nuts 122 and 124, the bolt 123 can be moved in the axial direction, which necessarily moves the center position. By so doing, the rest position of the wand arms can be adjusted. The shaft 104 is rotatable in a pair of bushings 126 which have a reduced diameter portion 128 that fit within a sleeve 130, with the annular face between the two diameter sections, shown at 132, bearing against the respective ends of the sleeve 130. A nut 134 is threaded upon the threaded portion 108 to hold the mechanism together. The sleeve 130 is secured within the housing by threaded bolts 134 which extend through suitable apertures in the side plates 112 and engaged threaded openings 136 in the sleeve.

To detect the angular position of the wands, an elongated block 140 is provided and includes an aperture 142 which fits over the end 106 of the shaft 104 and is secured by a set screw 144 that is threaded into an aperture (not shown) in the block 140. At the opposite end of the block 140 is a magnet 146 that is contained within a recess and is preferably the same size and type of magnet as the magnet 82. Thus, as the block 102 rotates with rotation of the wands 86, the block 140 similarly rotates and it is in close proximity to a stationary block 148 that is secured by set screws 152 located on opposite sides within the housing 85. The far end (as shown) of the block 148 contains an extension 154 which fits within an aperture in the rear face of the enclosure. Thus, by adjustment of the opposing set screws 152, the block may be adjusted left and right relative to the pivot point defined by the extension 152 for the purpose of centering the wand detection sensor 150. A pair of lock nuts 155, (one of which is shown) are applied to the bolt 123 on the outside of the housing 85 to secure the bolt position. The wand detection sensor 150 is also preferably a Hall effect head that is located within a groove in the undersurface of the block 148 and the electrical conductor 156 from the Hall effect sensor extends upwardly to the electrical circuitry to be described.

The guidance system includes an operator's console 160 that preferably is located in the tractor cab and it includes a bar graph meter 162 for the wand position and another bar graph indicator 164 for the hitch orientation. There is also a knob 166 for centering the implement during operation, a sensitivity control knob 168 for adjusting the quickness of correction as a function of detected changes in the orientation of the wand and/or crank arm, a feedback adjustment knob 170 which controls the degree of influence from the wand sensor relative to the hitch angle sensor, a power on and off switch 172, alarm switch 174 and a guidance control switch 176 which effectively controls the activation of the wand sensor signal that is used to calibrate the system and to turn off the wand sensor during travel from one field to another when the wand may be elevated and would be free to swing back and forth. Obviously, it is not desirable to have the control system make corrections during such time. It should also be understood that some implements may contact the rear tractor wheels when the implement is elevated and it is therefore necessary that the hitch 32 of the guidance system be perpendicular and centered so that such contact will not occur. In accordance with the present invention, a hitch sensor lockout switch 177 is provided to disconnect the hitch sensors from operation as will be described hereinafter.

Figure 10:
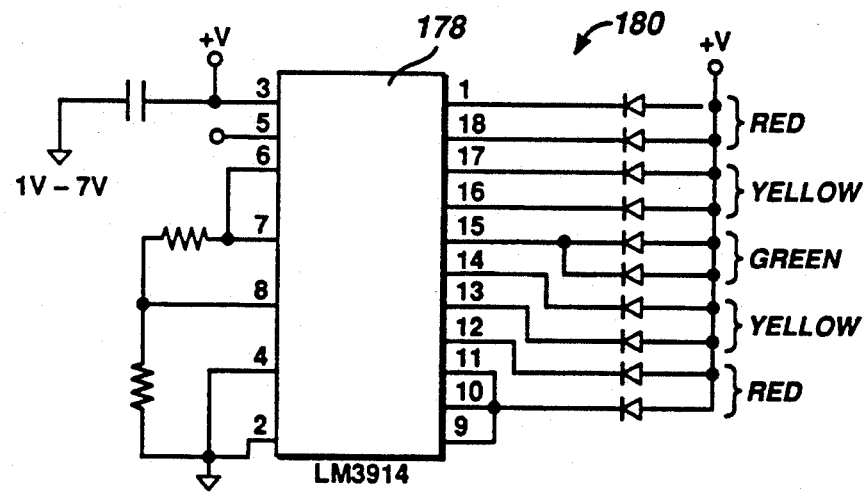
FIG. 10 is also an electrical schematic diagram of one of the bar graph displays of the console.
Figure 9:
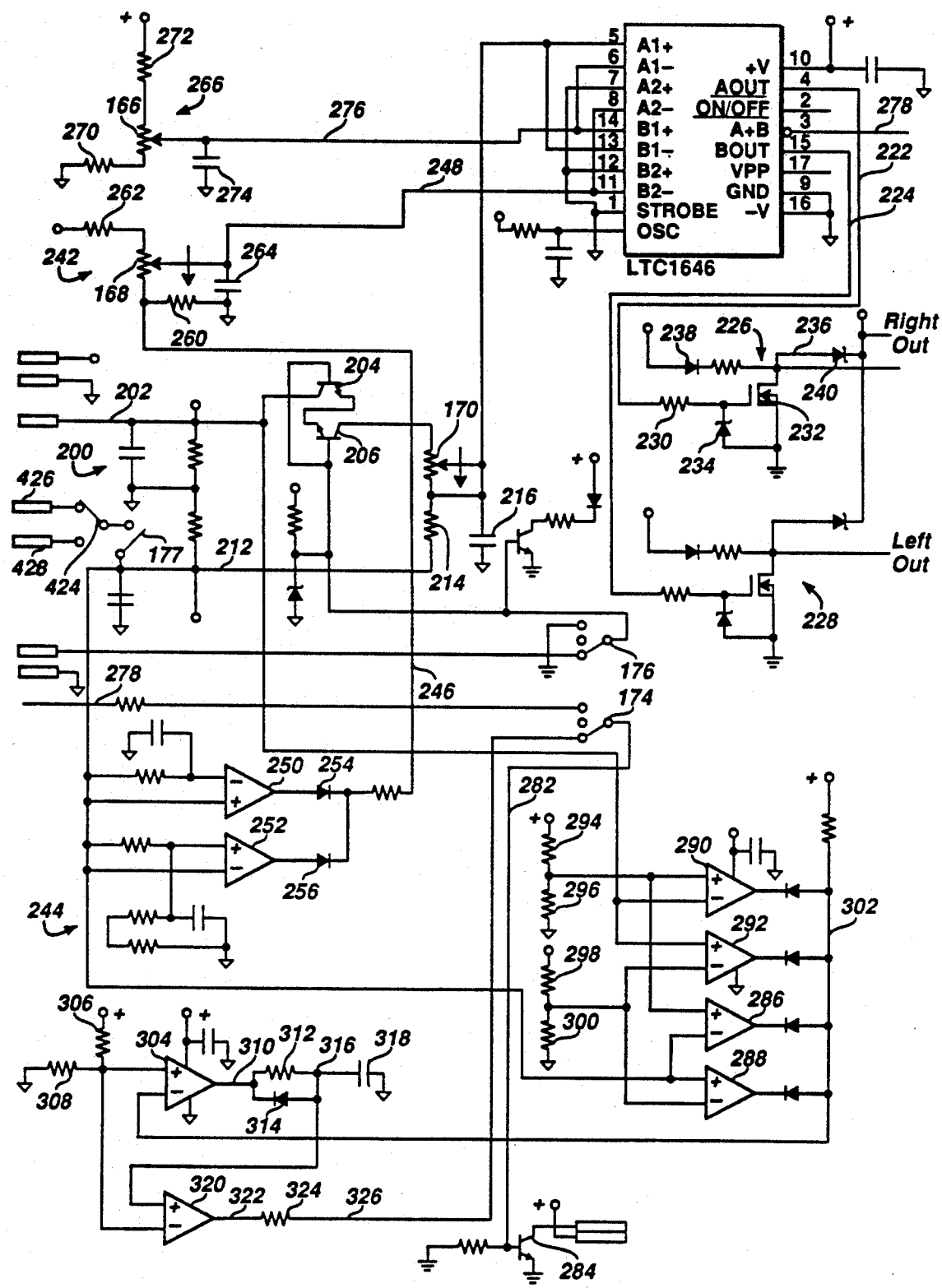
FIG. 9 is an electrical schematic diagram of the major portion of the circuitry associated with the guidance system embodying the present invention.

The signals from the hitch angle sensor and the wand sensor are applied to the circuitry which is located in the console, and also shown in FIGS. 9 and 10. The circuitry generally operates to receive the sensor signals and generate a correction signal, which can also be considered a feedback signal. Other portions of the circuitry detect whether the sensors are sensing that the mechanisms which carry them have traveled the full extent of their range of movement, and warning signals are selectively generated when this occurs. Other portions of the circuitry sense the existence and direction of any change that is occurring with respect to the guidance system hitch 32 angular position, and this detection is used to modify the length of time that a correction signal is being generated. This has the effect of using the momentum of the hydraulics to achieve centering without overshooting or hunting by the system.

With respect to the feedback circuitry, indicated generally at 200, it receives the output voltages from the wand sensor and the hitch angle sensor and provides a feedback output signal that is processed to produce drive signals for activating the solenoid valves for operating the hydraulic cylinders associated with the crank arm mechanisms that move to control the position of the center tube and therefore the implement.

Referring to the electrical schematic diagram of FIG. 9, the voltage from the wand sensor is applied on line 202 that extends to the collector of a transistor 204 the emitter of which is connected to the emitter of a transistor 206 and the collector of transistor 206 is connected to a potentiometer 170. The base of each of the transistors 204 and 206 are connected to the switch 176. The voltage from the hitch angle sensor is input to line 212 that is connected to resistor 214, which in turn is connected to ground through capacitor 216 and to potentiometer 170 and to an integrated circuit 218 via line 220, which circuit 218 operates as a sophisticated comparator device providing digital outputs depending upon the input levels and conditions which will be described. The circuit 218 is a model LTC 1040, manufactured by the Linear Technology Corporation.

The levels of the signal from the wand sensor on line 202 is applied to the bar graph driver circuit 178 shown in FIG. 10, which converts the signal level to light selected light emitting diodes shown generally at 180. The outer two pairs of diodes emit a red light, the adjacent pairs of diodes are yellow and the center pair of diodes are green. When the tractor and implement are centered, the green lights are illuminated and when error is detected in either direction, then the yellow or red lights would be illuminated. The circuitry for the hitch angle sensor is identical and these light emitting diodes are part of the display 162 and 164 of the console 160.

During operation when both the hitch angle sensor and wand sensor are activated, the voltage from each of the sensors, which typically are within the range of approximately 1 vdc to 7 vdc, are added and divided by two by the circuitry defined by potentiometer 170, resistor 214 and capacitor 216. If the potentiometer 170 is adjusted so that the resistance is lowest, then the voltage contribution from the wand is greater than from the hitch angle sensor, and the influence of the feedback circuit 200 is mostly that of the wand sensor. If the potentiometer 170 is adjusted to be approximately midway, then with the preferred values of the potentiometer 170 and resistor 214, the voltage contribution from the wand sensor is approximately preferably twice that of the hitch angle sensor, and with the addition and divide by two operation, results in a near cancellation of the influence of one sensor relative to the other.

In practical terms, if the wand is tracking to the left, the wand sensor will generate a signal that will cause a correction of the crank arm that will result in the wand becoming straight. The influence of the hitch angle sensor is a stabilizing voltage that will neutralize the effects of changes of the wand sensor signal and thereby reduces any "hunting" action that may otherwise occur by operation of the wand sensor itself in the absence of the hitch angle sensor signal.

As previously mentioned, the circuit 218 is a relatively sophisticated comparator circuit which provides outputs for operating the solenoid valves for controlling the hydraulic cylinders for moving the crank arm mechanisms. To this end, circuit 218 has output lines 222 and 224, which respectively extend to solenoid drive circuits 226 and 228, which control the right and left solenoids. Line 222 is connected to right solenoid drive circuit 226 and is connected to a resistor 230 which is connected to the gate of a MOSFET transistor 232 and to a zener diode 234. The transistor 232 is connected to line 236 and provides a high output when the transistor is conducting. An advantage of the use of the MOSFET transistor for providing the output is that there is very little voltage drop across the transistor and very little heat is produced by it during operation. This enables the transistor to be placed in a small protected enclosure and is not exposed to the dirty environment, and heat sinking is not particularly important. A light emitting diode 238 is provided to indicate when the solenoid is energized and may be helpful in troubleshooting the system in case of malfunction. A Schottkey diode 240 provides a clamping function, and zener diode 234 prevents transients from being applied to the gate of transistor 232. Line 236 goes low when transistor 232 is in conduction. The other circuit for the left solenoid is identical and will therefore not be described.

The circuit 218 thus provides output signals to the solenoid drive circuits which results in the hydraulic cylinders being activated to perform adjustment of the crank arm mechanisms and therefore the position of the center tube and the implement attached to the system.

The correction signals originate from the feedback circuit 200 as has been previously described.

In accordance with another aspect of the system, the solenoid valves that are used are model AMW4D61-12VDC as manufactured by the Wand Flue Company, which are available from Fluid Tech Co. of Kansas City, Mo. The solenoid construction is such that a spool within it must be moved and fluid is present within the chamber having the spool and that fluid must be displaced through a small orifice. The effect of the construction is that the solenoid has a softer operating action which minimizes shock to the system during operation. Also, the cylinders 38 and 40 are model T.K.3502220PA-04 as manufactured by Texas Hydraulics Company of Austin, Tex., and have a 2¼ inch stroke which is sufficient to provide the desired angular arc of approximately 13 degrees. It should be understood that the same cylinders are used in the preferred embodiment shown in FIG. 2 as well as the alternative embodiment shown in FIG. 12.

In accordance with an important aspect of the system, the operation of circuit 218 is also a function of other input signals which change the values on which a comparator decision is made to produce an output signal on either of lines 222 or 224. One of the input signals is provided by a sensitivity adjusting circuit 242 which changes the magnitude of the change in the output on line 220 from the feedback circuit 200 which results in an output from the circuit 218. Stated in other words, the size of the window is changed depending upon whether there are changes occurring in the signals produced by the sensors. If there is a change in the signal levels from either the wand sensor or the hitch angle sensor, the window is increased, so that corrective action is started by virtue of the feedback output signal on line 220, but as the correction occurs, the increased window size results in the corrective output signal on line 222 or 224 being terminated sooner, i.e., before it reaches the center position, so that the momentum of the system will bring it toward center and it will more accurately stop at the desired center position without further correction. Were the smaller window still employed, the circuit 218 would not terminate the output signal on line 222 or 224 until the smaller window value was reached, and the momentum of the system would carry it past center, requiring another corrective action in the opposite direction to reach the center position.

It should be appreciated that the sensor output signals result in the production of the output signal on line 220 from the feedback circuit 200 while the smaller window is employed and the enlargement of the window does not occur until the corrective action is triggered by circuit 218. However, once corrective action has begun, a crank arm movement detection circuitry 244 is provided for detecting a change in the hitch angle sensor signal value, and that circuit produces a signal on line 246 that is applied to the sensitivity adjusting circuit 242 which has an output on line 248 which changes the window size.

To detect movement of the crank arm mechanism, the hitch angle sensor signal on line 212 is applied to one input of each of two comparators 250 and 252, with one being applied to the positive input and the other to the negative input. The other input of each of the comparators is provided by the same signal, but delayed by a resistor capacitor combination as shown. The effect of the delay is that any change in the signal level is detected by one of the two comparators 250 or 252, with comparator 250 detecting a rise in the signal level and comparator 252 detecting a falling signal level. The outputs of both comparators 250 and 252 are ORed together via diodes 254 and 256, so that a high level is applied to line 246 if either is triggered.

The sensitivity adjusting circuit 242 comprises a potentiometer 168 together with resistor 260, resistor 262 and capacitor 264. If a high level signal is applied to line 246, a high level signal is provided on line 248 which changes the window size.

Another input that has the capability of changing the decision level of the circuit 218 is a center adjusting circuit, indicated generally at 266. It comprises a potentiometer 166 in combination with resistors 270 and 272 and capacitor 274. This circuit enables the center value to be adjusted by the operator during operation. The preferred value for the output of this circuit is approximately 4 vdc and this is applied to the circuit 218 via line 276.

The circuit 218 also has an output line 278 which provides a high level signal when either of outputs 222 or 224 are off. Line 278 is connected to a switch 174, which is a three position switch that controls the operation of the buzzer. The upper position is used during calibration of the guidance control system, the lower position is used during running of the system, and a middle position (not specifically shown) is off. During calibration of the system, when the operator is centering the wand sensor and crank arm mechanism, the switch 174 is placed in the upper position, and adjustment of the positioning mechanisms of the sensor can be made, which will result in the buzzer being activated when the sensors are centered. The switch 174 is connected by line 282 to a transistor 284 which activates the buzzer.

In accordance with another aspect of the system, it includes a limit detection circuit which detects whether either the wand as well as the crank arm mechanism has reached nearly to their full extent of its range of movement in either direction. When this has occurred, it is an indication that something is amiss in the operation of the system, particularly if it is continuing. To this end, the hitch angle sensor signal on line 212 is applied to one input of each of comparators 286 and 288, while the wand sensing signal on line 202 is applied to one input of each of comparators 290 and 292. A voltage divider comprises of resistors 294 and 296 provide a low voltage of approximately 2 vdc to comparator 290 and 286, while another voltage divider comprised of resistors 298 and 300 provide a high voltage of approximately 6 vdc to comparators 292 and 288. Thus, when the voltage level from either of these signals drops below 2 vdc or exceeds 6 vdc, at least one of these comparators switches to provide a low signal on line 302, indicating that either the wand or the crank arm mechanism has moved to a position that is beyond the normal operating position, which if sustained, means that the system may not be operating properly.

During normal operation the switch 174 is placed in the lower position, which places a time delay circuit in operation. This circuit is effect to delay the activation of the buzzer for a period of approximately 3 to 5 seconds after initially receiving a signal from the limit detection circuitry on line 302 which indicates that either or both of the wand and crank arms have traveled the full extent of their range of movement in either direction. However, during the operation by an operator, the tractor will reach the end of a row and the tractor must turn to go down other rows. During such turning, the implement will be lifted out of the ground and the wands will then be in the air and will typically move back and forth and travel to the limits of its range of movement. Since the operator knows what is occurring at such time, it may be annoying for the operator to hear the buzzer sound, and it is for this reason, among others, that the time delay circuit is provided.

The true or active signal on line 302 is a low level and it is applied to the negative input of a comparator 304, the other input is provided by a voltage from a voltage divider comprised of resistors 306 and 308. When the low level signal appears on line 302, a high output is produced by the comparator 304 o line 310 which is connected to resistor 312 and to a diode 314, which are connected in parallel to a line 316. Line 316 is connected to ground through capacitor 318 and to the positive input of a comparator 320, the other input of which is supplied by the voltage divider connected to comparator 304. Comparator 320 provides a high level signal on line 322 which is connected to the transistor 284 through a resistor 324, line 326, switch 174 and line 282, and activates the buzzer. The capacitor 318 takes approximately 3 to 5 seconds to charge to a level which switches comparator 320, which is the desired delay. If the signal on line 302 again goes high, indicating that both sensors are with the normal operating limits, comparator 304 will provide a low output on line 310 and the capacitor 318 will be quickly discharged, switching comparator 320 and deactivating the buzzer.

When the switch 176 is placed in either the up or down position, transistors 206 and 204 are switched off, which precludes any output being generated from the feedback circuit 200 resulting from the wand movement, which would occur, for example, if a driver were moving the tractor from one field to another or the like, during which time the implement is raised, and the wands would quite likely be moving around. Obviously, it would not be desirable for the guidance system to be activating the hydraulic cylinders at such time, for it would serve no useful purpose.

With the wand sensor deactivated, the output from the feedback circuit 200 is totally comprised of the voltage from the hitch angle sensor on line 212 through resistor 214. This has the effect of centering the crank arm mechanism with the wands in any position which is desirable when the implement is to be lifted. If it were not centered, some implements may contact the rear wheels of the tractor when they are in their fully elevated positions.

Turning now to the alternative embodiment for a pull hitch application of the guidance system, and referring to FIGS. 11, 12 and 13, a hitch mechanism, indicated generally at 350, is adapted to be attached to an implement that is to be pulled by a tractor and the implement has a pull hitch 352 that is attached to a single point hitch of the tractor.

The implement has a transverse main tool bar 354 and the hitch mechanism 350 is attached between the pull hitch 352 and the tool bar 354. The pull hitch 352 has an end plate 356 that abuts an end plate 358 of the hitch mechanism 350 and is bolted thereto by bolts 360. Similarly, the opposite end of the hitch mechanism 350 has an end portion 362 that is attached to the tool bar 354 by a number of U-bolts 364 and associated nuts 366.

The end portion 362 is part of a generally U-shaped frame having upper and lower leg portions 368 and 370 between which a hollow cylindrical sleeve 372 is preferably welded. A short hollow cylindrical boss 373 is welded to the upper side of the leg portion 368 and to the lower side of the leg portion 370 and a shaft 374 extends through the bosses 373 and the sleeve 374 as well as through apertures in upper and lower plates 376, 378 so that rotation of the leg portions 368, 370 relative to the plates 376, 378 can occur. A pin 379 extends through suitable apertures in the upper boss and the shaft 374 to hold the shaft in place. The structure therefore permits changing of the angular relation of the tool bar 354 relative to the pull hitch 352, and enables the guidance system to achieve centering in the same manner as has been described with respect to the preferred embodiment.

To control the angular relation of the tool bar 354 and the pull hitch 352, a pair of hydraulic cylinders 382, 384 are provided and they are attached by pins 386 that extend between ears 388 that are welded to the end portion 362 and end plate 358 as illustrated. The hydraulic system is preferably powered by the hydraulic system of the tractor via lines 390 which connect to a 4-way valve 392 mounted on the upper plate 376. Hydraulic lines 394 extend from the valve 392 through apertures 396 in the upper plate 376 to T-connectors (not shown). Each T-connector connects to the rod end of one cylinder and the butt end of the other so that pressure in one line will cause the piston of one cylinder to extend and the other to retract.

In accordance with an important aspect of this embodiment, the structure 350 is designed to be compact in size, it preferably having a width of approximately 14 inches and a length of approximately 20 inches. The hydraulic cylinders are located substantially within the confines of the plates 376 and 378 and are therefore protected by the plates.

To sense the angular position of the tool bar 354 relative to the pull hitch 352, a hitch angle sensor is provided and is of the same construction as that illustrated and described in FIGS. 2, 7 and 8, with the components shown in FIG. 11 and 13 having the same identifying numbers, but with a prime (') designation. As shown the housing 64' of the sensor 60' is attached to the bushing assembly and is stationary. The arm 62' is attached to the plate 376 and therefore rotates relative to the housing when the pull hitch angular position changes with respect to the tool bar 354. As shown in FIG. 11, a wand sensor structure 84' is attached to the tool bar by U-bolts 398.

While the preferred embodiment and the above described alternative embodiment preferably employ the Hall effect sensors in combination with magnets, it is also contemplated that other sensors could be used in connection with the structure of sensor supports shown in FIGS. 4, 7, 8, 11, 12 and 13. In this regard, a linear voltage differential transducer arrangement in combination with an iron slug could be substituted for the Hall effect sensor-magnet combination. Such an arrangement would not have some of the advantages of the Hall effect sensor arrangement, and is believed to be more costly. While the linear voltage differential transducer arrangement may be somewhat more accurate, the degree of accuracy over the Hall effect sensor arrangement is believed to be unnecessary, and does not justify the increased costs.

Figure 14:
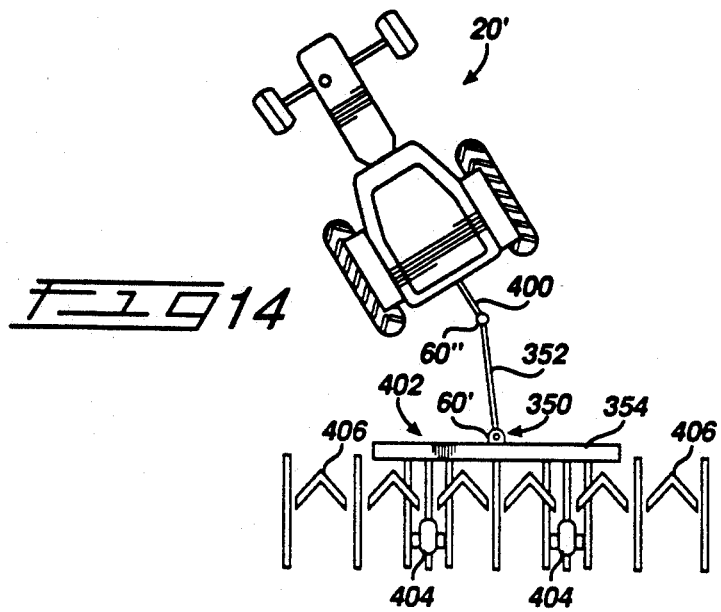
FIG. 14 is a simplified top view of a tractor with a pull hitch implement turning around at the end of a row and illustrating the operation of the guidance system of the present invention.

In accordance with the present invention, and referring to the drawings of the preferred embodiment, FIG. 14 illustrates a tractor 20' which has a pull hitch 400 to which the implement hitch 352 of an implement 402 is attached. The implement has the tool bar 354 and the tool bar is connected to the implement hitch 352 by the hitch mechanism 350 shown in FIGS. 11-13. The implement has wheels 404 which are vertically moveable by conventional hydraulic cylinders which enables the implement tools 406 to be selectively raised and lowered into and out of working engagement with the soil. The implement 402 is raised, i.e., the wheels are lowered when the implement is moved between fields for example and during turning around after the end of the rows is reaching during a pass through the field. After the tractor has turned around, the implement is then lowered into working relation as the tractor enters another set of rows for making another pass through the field.

When the tractor turns around at the end of the row, it is desirable that the turning radius be as small as possible because a lesser turning area often results in longer rows and greater crop yields. If the field has a fence or an irrigation ditch or tree line at the end of the rows, then the smaller turning radius is more important than if the tractor could travel into an adjacent field that is fallow or is planted with alfalfa or the like where damage by tractor tracks is minimal.

In accordance with an important aspect of the present invention, the turn around area is minimized by causing the pull hitch implement to swing out as the tractor is turning around. Referring to FIG. 14, as the tractor 20' exits the rows, the implement 402 is raised and the tractor 20' turns to the left, the present invention then causes the implement to move to the right and cause the implement to travel to the right of the path it would otherwise take. As the tractor enters the rows for the next pass, the implement will enter the rows in the desired position behind the tractor. Because the implement actually follows almost the exact path that the tractor takes, the turning radius does not need to be increased to compensate for an implement turning path that would otherwise be inside the path of the tractor, if the guidance system were not operating in the turnaround mode.

Figure 17:
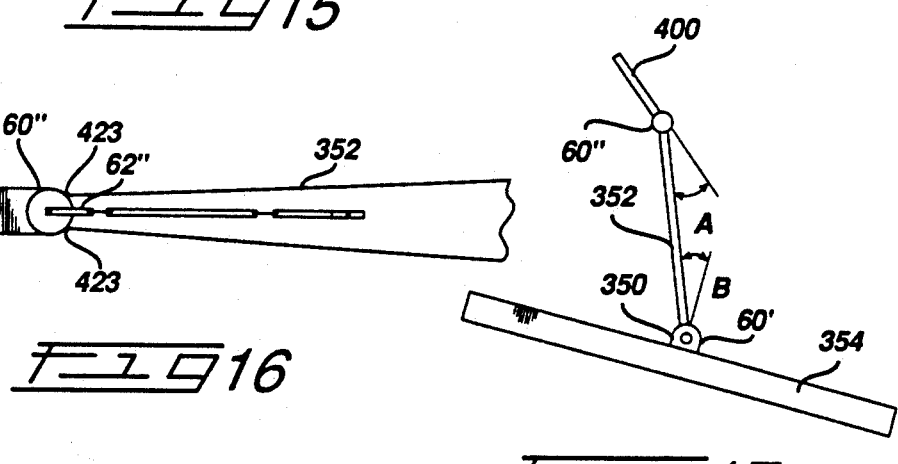
FIG. 17 is a diagrammatic illustration of a portion of a pull hitch of a tractor, the implement hitch and implement tool bar for illustrating the principle of operation of the present invention.

The manner in which the system operates can be described in connection with FIG. 17 which diagrammatically illustrates the tractor hitch 400, the implement hitch 352, the implement hitch mechanism 350 and the implement tool bar 354. When the system is operating in the row following mode of operation, the hitch mechanism 350 varies the angle of the hitch 352 relative to a line perpendicular to the tool bar 354, i.e., angle B as shown, to cause the implement to accurately follow the crop rows. The hitch mechanism 350 has a sensor 60' which senses the angle B during the row following mode of operation. During the turnaround mode of operation, another sensor 60" is activated and the sensor 60' is deactivated. The sensor 60", located at the connection of the tractor hitch 400 and the implement pull hitch 352 senses the angle between the tractor hitch 400 and the implement pull hitch 352. The angle A, as shown, is the supplementary angle to the angle between the tractor hitch and the pull hitch. It should be appreciated that the tractor hitch 400 is coextensive with the lengthwise direction of the tractor. For the purposes of the present invention, the hitch 400 is not required to be exactly so, but is preferred.

During operation in the turnaround mode, the sensor 60" generates a signal that is used in the circuitry of FIG. 9 to control the hitch mechanism 350 to change the angle B of the line perpendicular to the tool bar 354 relative to the angle of the hitch 352 to reduce the angle A to zero or as close to zero as possible. Stated in other words, as the tractor moves forwardly and turns left, increasing the angle B will have the effect of reducing the angle A, and in so doing the implement will move to the right of the path the implement would otherwise take. The reduction of angle A brings the tractor hitch 400 and the pull hitch 352 as close to linear (180 degrees) as possible.

Figure 15:
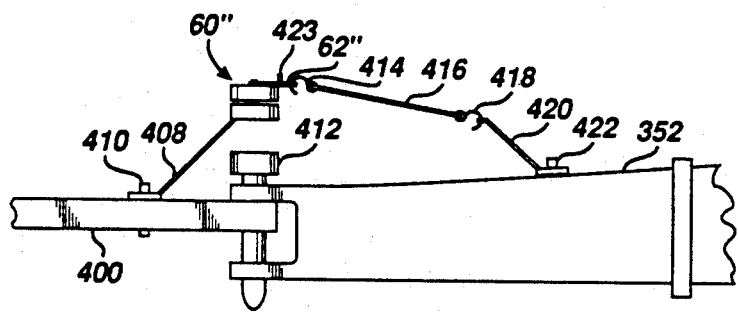
FIG. 15 is a side elevation of a portion of a pull hitch of a tractor and a portion of the implement hitch and illustrating the turnaround sensor.
Figure 16:
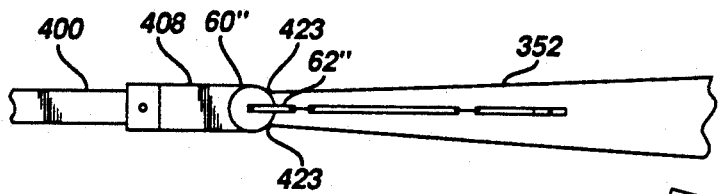
FIG. 16 is a top view of that shown in FIG. 15.

The sensor 60" is preferably identical in construction as the sensor 60' and is mounted as shown in FIGS. 15 and 16. The sensor 60" is attached to a bracket 408 that has its other end attached to the tractor hitch 400 by a bolt 410 or the like. The sensor 60" is positioned over a hitch pin 412 and has a rotatable arm 62" with an opening in the outer end thereof that is adapted to receive a hook 414 of an elastic strap 416. The strap has another hook 418 on the other end which connects to a bracket 420 attached to the implement hitch 352 by a bolt 422. The elastic strap 416 is strong enough to rotate the arm 62" to accurately sense the angle of the tractor hitch 400 relative to the implement hitch 352, but is adapted to compensate for angular changes between the two in the vertical direction due to uneven terrain or the like. Pins 423 are preferably provided on each side of the arm 62" to limit angular movement of the arm to an angle within the range of approximately 11 degrees to 13 degrees to each side relative to center.

Figure 5:
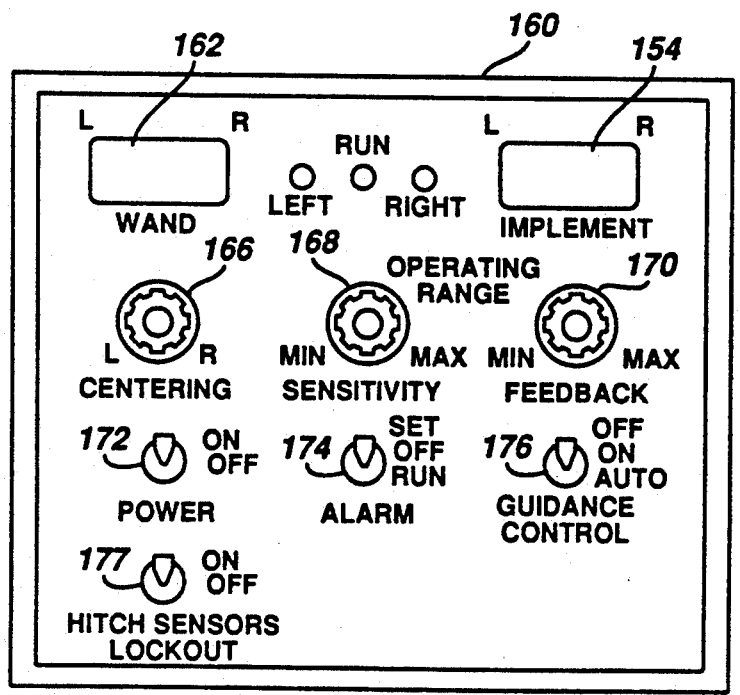
FIG. 5 is a front plan view of the operator console portion of the guidance system of the present invention.

The circuitry of FIG. 9 has been hereinbefore described except for the inclusion of the sensor 60" and switches controlling the row following mode and the turnaround mode of operation. Referring again to FIG. 9, a switch 424 is provided and it has two positions, with, line 426 being connected to the output of the sensor 60" and line 428 being connected to sensor 60'. Switch 424 is preferably a microswitch that is controlled by the raising and lowering of the implement wheels, although it can be manually operated if desired. Preferably, when the tractor comes to the end of the rows and the operator raises the implement by lowering the wheels, the switch is operated by such movement and the sensor 60' is switched out of the circuit and the sensor 60" is switched into the circuit. The switch 177 is provided to selectively lockout both of the sensors 60' and 60" if desired, and this switch is preferably located on the control module 160 as shown in FIG. 5.

From the foregoing discussion, it should also be understood that the turnaround mode of operation may have applicability to nonfarming applications, where a row following mode would not be used. For example, any trailing vehicle that is linked to a leading vehicle by a pull hitch may advantageously use such a system having only the turning mode of operation for the purpose of minimizing the need to make wide swings to turn corners. Such applications would include truck rigs which include multiple trailing vehicles or trailers that are attached to the leading trailer or vehicle by a pull hitch.

In accordance with another important aspect of the present invention, an alternative embodiment is useful for a tractor-implement combination that utilize the quick hitch or 3-point hitch configuration as shown in FIGS. 1 and 2, for the purpose of having the implement trail the tractor in a centered position. This is useful when the implement is a planter, for example, and the tractor is working a field that has no crops or furrows in which the wand can be effectively used. As previously mentioned, when the guidance system is in the row following mode of operation, the sway blocks of the 3-point hitch are removed so that the guidance system hitch 32 can move from side to side during operation. Since such movement is required during the row following mode, when the planting or similar farming operation is being done, the implement may similarly move from side to side even if the tractor is moving in a desired path, and the result is that the rows may not be straight or may not follow the desired path. Referring to FIGS. 18 and 19, the system of the present invention is adapted to cause the implement to be centered relative to the tractor during a trailing mode of operation, and this is accomplished by switching into the circuit of FIG. 9 a sensor 60''' that is attached to the guidance system hitch 32 by a bracket 432, with the rotatable arm 62''' being connected to the tractor by a rubber strap 416' and a bracket 434. The sensor generates a signal that is used to center the implement relative to the tractor. The switch 424 (FIG. 9) in this embodiment is manually controlled by the operator and the switch selectively controls whether the system is in the trailing or centered mode of operation and the row following mode of operation.

From the foregoing description, it should be understood that an improved guidance control system for farm tractors and the like has been shown and described which has many superior attributes and advantages. The system has operational capabilities that contribute to its ease of operation, flexibility of adjustment and reliability.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. Apparatus for positioning an implement being drawn by a tractor or the like to travel along a desired path of movement, the tractor having a mounting hitch for the implement, said apparatus being adapted to selectively operate in one of a row following mode and a trailing mode, said apparatus comprising:
   hitch means adapted for attachment to the mounting hitch of the tractor and adapted to have the implement mounted thereto, said hitch means having hydraulic means for selectively retracting and extending each side of the hitch means generally horizontally relative to the mounting hitch of the tractor to thereby adjust the angular orientation of said hitch means relative to the mounting hitch;
   first sensing means adapted, during the row following mode, for sensing the angular orientation of said hitch means relative to the mounting hitch and generating a signal indicative of said sensed orientation;
   wand means operatively associated with said apparatus and adapted during said row following mode to detect the lateral position of the implement relative to the desired path as the tractor moves generally along the desired path;
   second sensing means adapted, during the row following mode, for sensing the position of said wand means and generating a signal that is indicative of said sensed position;
   third sensing means adapted, during the trailing mode, for sensing the lateral position of said hitch means relative to the tractor and generating a signal that is indicative of said sensed position;
   means for switching said apparatus between said row following mode and said trailing mode;
   means for controlling said hydraulic means during said row following mode to adjust the angular orientation of said hitch means so that the implement follows the desired path of movement in response to said signals from said first and second sensing means;
   said controlling means controlling said hydraulic means during said trailing mode to adjust the angular orientation of said hitch means so that the implement is maintained in a predetermined lateral position relative to said tractor in response to said signal from said third sensing means.

2. Apparatus as defined in claim 1 wherein said predetermined lateral position is centered relative to said tractor.

3. Apparatus as defined in claim 1 wherein said third sensing means comprises:
   a first member mounted to the mounting hitch;
   an elongated lever arm;
   a second member adjacent said first member, said second member being attached to said elongated lever arm and being pivotable therewith around an axis;
   an elastic strap interconnecting said lever arm and said tractor and adapted to rotate said lever arm in response to said mounting hitch moving laterally relative to said tractor;
   magnet means being attached to one of said first and second members;
   Hall effect sensing means being attached to the other of said members in close proximity to said magnet means, said Hall effect sensing means being adapted to provide an electrical signal that varies as said second member is pivoted.

4. Apparatus for positioning an implement having a pull hitch that is adapted to be attached to a tractor and being of the type which has a generally transverse tool bar, the tractor having at least a center mounting hitch to which the pull hitch of the implement can be attached, said apparatus being adapted to selectively operate in one of a row following mode and a turnaround mode, said apparatus comprising:
   hitch means adapted for attachment to the implement between the pull hitch and the tool bar thereof, said hitch means having hydraulic means for selectively retracting and extending each side of the tool bar generally horizontally relative to the pull hitch to thereby adjust the angular orientation of the pull hitch relative to the tool bar;
   first sensing means for sensing, during the row following mode, the angular orientation of said pull hitch relative to the tool bar and generating a signal indicative of said sensed orientation;
   wand means operatively associated with said apparatus and adapted to detect the lateral position of the implement relative to a desired path as the tractor moves generally along the desired path;
   second sensing means for sensing, during the row following mode, the position of said wand means and generating a signal that is indicative of said sensed position;
   third sensing means adapted, during the turnaround mode, for sensing the angular position of the pull hitch relative to the lengthwise direction of the tractor and generating a signal that is indicative of said sensed position;

means for switching said apparatus between said row following mode and said turnaround mode;

means for controlling said hydraulic means for adjusting the angular orientation of the tool bar relative to the pull hitch so that during the row following mode the implement follows the desired path of movement in response to said signals from said first sensing means and said second sensing means;

said controlling means controlling said hydraulic means during said turnaround mode to adjust the angular orientation of said hitch means so that the angle of said pull hitch relative to the lengthwise direction of the tractor approaches 180 degrees during turnaround of the tractor in response to said signal from said second sensing means.

5. Apparatus as defined in claim 4 wherein said third sensing means comprises:

a first member mounted to one of said tractor hitch and said pull hitch;

a second member connected to and being rotatable relative to said first member and having an end portion that moves through a predetermined arc during rotation of the shaft through said predetermined angle of rotation;

an elastic strap interconnecting said second member and the other of said tractor hitch and said pull hitch and adapted to rotate said second member in response to any change in the angle of said tractor hitch relative to said pull hitch;

a magnet means attached to one of said first and second members;

a Hall effect sensing means attached to the other of said members in close proximity to said magnet means, said Hall effect sensing means being adapted to provide an electrical signal that varies as a function of the angular position of said first member relative to the second member.

6. Apparatus as defined in claim 4 wherein the implement is of the type which has wheels and a hydraulic means for selectively raising and lowering the wheels in response to operator commands, said switching means comprises a switch operatively connected to said wheels and being actuable in response to the raising and lowering of the wheels.

7. Apparatus for positioning an implement having a pull hitch that is adapted to be attached to a tractor and being of the type which has a generally transverse tool bar, the tractor having at least a center mounting hitch to which the pull hitch of the implement can be attached, said apparatus being adapted to selectively operate in one of a row following mode and turnaround mode said apparatus comprising:

hitch means adapted for attachment to the implement between the pull hitch and the tool bar thereof, said hitch means having hydraulic means for selectively retracting and extending each side of the tool bar generally horizontally relative to the pull hitch to thereby adjust the angular orientation of the pull hitch relative to the tool bar;

first sensing means for sensing, during the row following mode, the angular orientation of said pull hitch relative to the tool bar and generating a signal indicative of said sensed orientation;

wand means operatively associated with said apparatus and adapted to detect the lateral position of the implement relative to a desired path as the tractor moves generally along the desired path;

second sensing means for sensing, during the row following mode, the position of said wand means and generating a signal that is indicative of said sensed position;

third sensing means adapted, during the trailing mode, for sensing the angular position of the pull hitch relative to said tractor hitch and generating a signal that is indicative of said sensed position;

means for switching said apparatus between said row following mode and said turnaround mode;

means for controlling said hydraulic means for adjusting the angular orientation of the tool bar relative to the pull hitch so that during the row following mode the implement follows the desired path of movement in response to said signals from said first sensing means and said second sensing means;

said controlling means controlling said hydraulic means during said turnaround mode to adjust the angular orientation of said hitch means so that the angle of said pull hitch relative to said tractor hitch approaches 180 degrees during turnaround of the tractor in response to said signal from said third sensing means.

8. Apparatus as defined in claim 7 wherein said hitch means has a horizontally pivotable portion attached to the pull hitch and a nonpivotable portion attached to the tool bar, said hitch means having at least one hydraulic cylinder with an extendable and retractable piston for selectively retracting and extending each side of the pivotable portion generally horizontally relative to the implement tool bar.

9. Apparatus for positioning a wheeled trailing vehicle having a main body and a pull hitch that is adapted to be connected to a centered mounting hitch attached to a wheeled leading vehicle, said apparatus being adapted to cause said trailing vehicle to follow substantially the same path as the leading vehicle during forward movement while turning, said apparatus comprising:

hitch means adapted for attachment to the trailing vehicle between said pull hitch and said main body, said hitch means having hydraulic means for selectively pivoting said pull hitch from side to side relative to said main body to thereby adjust the angular orientation of the pull hitch relative to said main body;

sensing means adapted for sensing the angular position of the pull hitch relative to said leading vehicle mounting hitch and generating a signal that is indicative of said sensed position;

means for controlling said hydraulic means during said forward turning movement to adjust the angular orientation of said hitch means so that the angle of said pull hitch relative to said leading vehicle mounting hitch approaches 180 degrees during turnaround of the tractor in response to said signal from said sensing means.

* * * * *